(12) United States Patent
Leonard et al.

(10) Patent No.: US 9,802,629 B2
(45) Date of Patent: Oct. 31, 2017

(54) AUTOMATIC BAIL OFF FOR LOCOMOTIVE BRAKING SYSTEM

(71) Applicant: New York Air Brake, LLC

(72) Inventors: Erich Leonard, Clayton, NY (US); Bryan McLaughlin, Watertown, NY (US); Daniel James, Theresa, NY (US); Peter Greetham, Cicero, NY (US)

(73) Assignee: New York Air Brake, LLC, Watertown, NY (US)

( * ) Notice: Subject to any disclaimer, the term of this patent is extended or adjusted under 35 U.S.C. 154(b) by 11 days.

(21) Appl. No.: 15/006,361

(22) Filed: Jan. 26, 2016

(65) Prior Publication Data

US 2017/0210399 A1    Jul. 27, 2017

(51) Int. Cl.
*G05D 1/00* (2006.01)
*B61H 9/00* (2006.01)
*B61L 27/04* (2006.01)
*B60T 13/66* (2006.01)

(52) U.S. Cl.
CPC .......... *B61H 9/006* (2013.01); *B60T 13/665* (2013.01); *B61L 27/04* (2013.01)

(58) Field of Classification Search
CPC ...... B60T 13/665; B60T 17/228; B60T 15/14; B61H 9/006; B61L 27/04
USPC .............. 701/19, 20, 70; 303/15, 16, 20, 86
See application file for complete search history.

(56) References Cited

U.S. PATENT DOCUMENTS

| | | | |
|---|---|---|---|
| 5,286,096 A * | 2/1994 | Ferri .................... | B60T 13/665 303/15 |
| 5,590,042 A * | 12/1996 | Allen, Jr. ............. | B60T 17/228 246/182 B |
| 9,238,473 B2 | 1/2016 | Leonard et al. | |
| 2015/0353061 A1* | 12/2015 | Leonard ............... | B60T 13/665 701/19 |

OTHER PUBLICATIONS

International Search Report and Written Opinion Form PCT/ISA/220, International Application No. PCT/US2016/014836, pp. 1-10, dated Oct. 18, 2017.

* cited by examiner

*Primary Examiner* — Gertrude Arthur Jeanglaude
(74) *Attorney, Agent, or Firm* — Bond Schoeneck & King, PLLC; David Nocilly

(57) ABSTRACT

A system for automatically performing a bail off of the locomotive brakes in response to certain train braking operations without the need for the train operator to manually bail off the locomotive brakes. The system includes a controller that is programmed to determine when an appropriate train braking operation has been requested and to issue commands to the locomotive braking system to cause the locomotive brake cylinder to be reduced to zero pressure or a predetermined minimum pressure. The controller is also programmed to determine when an automatic bail off should be inhibited and/or cancelled depending on ongoing train conditions.

11 Claims, 6 Drawing Sheets

AUTOMATIC BAIL OFF FOR LOCOMOTIVE BRAKING SYSTEM

BACKGROUND OF THE INVENTION

1. Field of the Invention

The present invention relates to locomotive braking systems and, more particular, to an automatic bail off during brake applications.

2. Description of the Related Art

A locomotive operator using a pneumatic or electro-pneumatic braking system is required to make a reduction in the brake pipe (BP) pressure to apply the train brakes. Due to operating rules or conditions of train control, the locomotive operator may have to perform a bail off that prevents the locomotive brake cylinders from applying while a reduction in brake pipe pressure is made to apply the train brakes. Generally, the term bail off is used to refer to the removal of pressure from the brake cylinders of a locomotive or multiple locomotives in a consist.

To accomplish the application of the train brakes and a bail off of the locomotive brakes, the locomotive operator must perform two operations simultaneously, which typically requires the use of both hands on the equipment that allows the operator to apply the train brakes while preventing the locomotive brake cylinders from applying. A locomotive operator has, however, many other demands on his or her attention in situations where the train brake are being applied. The act of bailing off the locomotive brakes must happen regardless of the situation and therefore is an added activity that can distract from other decisions and actions that the locomotive operator must perform, such as determining the appropriate amount of brake pipe reduction to be made, deciding whether dynamic braking should be applied, etc. Similar decisions and operations must also be made in electronically controlled pneumatic (ECP) brake control systems with respect to the train brake command (TBC) communication level and the resulting effect on the locomotive brake cylinder pressure. Accordingly, there is a need in art for a system that can reduce the level of input needed from the locomotive operator to bail off the locomotive brakes during a train braking event.

BRIEF SUMMARY OF THE INVENTION

The invention comprises a system for automatically bailing off a train having a locomotive braking system with at least one locomotive brake cylinder.

The system includes a controller programmed to determine when an operator of the train has initiated a brake application and to send a bail off command to the locomotive braking system that results in a release of a predetermined amount of pressure from at least one locomotive brake cylinder. The controller may be integrated with or coupled to a conventional train braking system, which has a locomotive operator input with a train brake handle and an independent brake handle, and is interconnected to the rail car braking system and locomotive braking system. The locomotive braking system responds to the bail off command sent by the controller by releasing the predetermined amount of pressure from at least one locomotive brake cylinder.

In one approach, the controller is programmed to determine whether the operator of the train performed a manual bail off of the locomotive braking system in connection with a prior train brake application and to enable the sending of the bail off command only if the operator of the train performed the manual bail off. The controller is further programmed to send the bail off command if the operator of the train performed a manual bail off of the locomotive braking system in connection with a prior train brake application and the operator of the train subsequently initiates another brake application. The controller is also programmed to determine whether the operator of the train has requested a subsequent brake application beyond the equivalent of a full service brake and, if so, to send a command cancelling the bail off.

In another approach, the controller is programmed to determine whether the operator of the train has initiated a brake application between a minimum service brake application and a full service brake application and to send the bail off command if the brake application is between a minimum service brake application and a full service brake application. The controller is also programmed to determine whether the operator of the train has requested a subsequent brake application beyond the equivalent of a full service brake and, if so, to send a command cancelling the bail off.

In a further approach, the controller is programmed to determine whether there is an end of train signal and to only send a bail off command if there is an end of train signal.

In an additional approach, the controller is programmed to determine if the locomotive is in lead cut-in prior to sending a bail off command. The controller is also programmed to determine that locomotive is not in an emergency state prior to sending a bail off command. The controller is further programmed to determine that the locomotive is not in a penalty state prior to sending a bail off command.

The controller may be programmed to perform any one of or all of the various approaches to performing an automatic bail off, thereby relieving the operator of the responsibility to manually input the train braking command into a first manual input as well as manually performing a bail off of the locomotive brakes using a second manual input.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
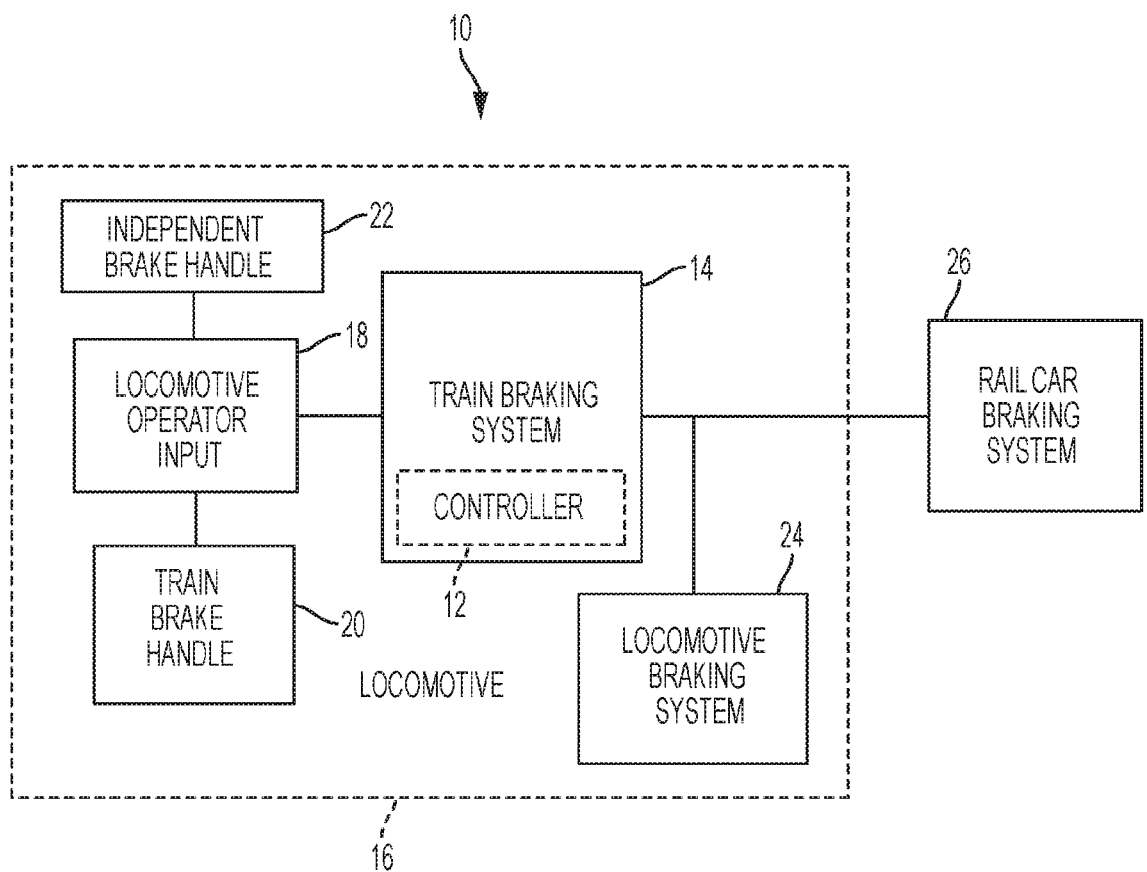
FIG. 1 is a schematic of a system for automatically providing a bail off of the locomotive brakes during a train brake application according to the present invention.

Referring now to the drawings, wherein like reference numerals refer to like parts throughout, there is seen in FIG.

1 a system 10 for automatically providing a bail off of the locomotive brakes during a train brake application, referred to herein as an automatic bail off operation. More particularly, system 10 comprises an automatic bail off controller 12, which may be provided by programming the existing programmable elements of train braking system 14 of a locomotive 16 or by providing controller 12 as a separate module that is interfaced with train braking system 14, such as by interconnecting controller 12 to a network bus such as those typically included with the electronic brake valve and processor of an electronically controlled train braking system 14. Train braking system 14 is interconnected to a locomotive operator braking input 18, which can include a train brake handle 20 as well as an independent brake handle 22. Train braking system 14 is also interconnected to the locomotive braking system 24 and the rail car braking system 26.

Regardless of whether controller 12 is integrated into train braking system 16 or provided as a separate module, controller 12 is programmed to perform certain decision-making procedures in response to receiving an input from the locomotive operator via input 18 as well as other braking system conditions and, when appropriate, issues the appropriate commands to locomotive braking system 24 to perform a bail off of the locomotive brakes without any additional manual inputs from the locomotive operator, such as the operator having to physically move independent brake handle 22. The commands sent by controller 12 may comprise a signal such as an independent actuating and release (IA & R) pressure, an electrical signal, or a communication signal sent through a serial communication port or a train network, that cause locomotive braking system 24 to bail off the locomotive brakes during a train braking operation. The automatic bail off operation can be configured to result in a complete exhausting of the locomotive brake cylinder pressure to zero pounds per square inch (psi) or to a predetermined minimum locomotive brake cylinder pressure, such as 10 psi, that is sufficient to minimize train run-in during a train brake application while still allowing the locomotive braking system to provide some braking force to the train. The automatic bail off operation may also be configured to operate in conjunction with locomotive braking system 24 to initially bail off to a zero psi pressure level in the locomotive brake cylinders and then gradually increase the locomotive brake cylinder pressure over a predetermined time period and at a predetermined rate to eliminate train run-in during the initial brake application while minimizing the train stopping distance by restoring the locomotive brakes to a level that helps brake the mass of the locomotive(s) after the train brake application has had time to propagate through the entire train. The predetermined time period and predetermined rate may be determined based on factors such as the particular composition of the train, the requirements of the applicable governmental safety regulations, or customer preferences.

Figure 2:
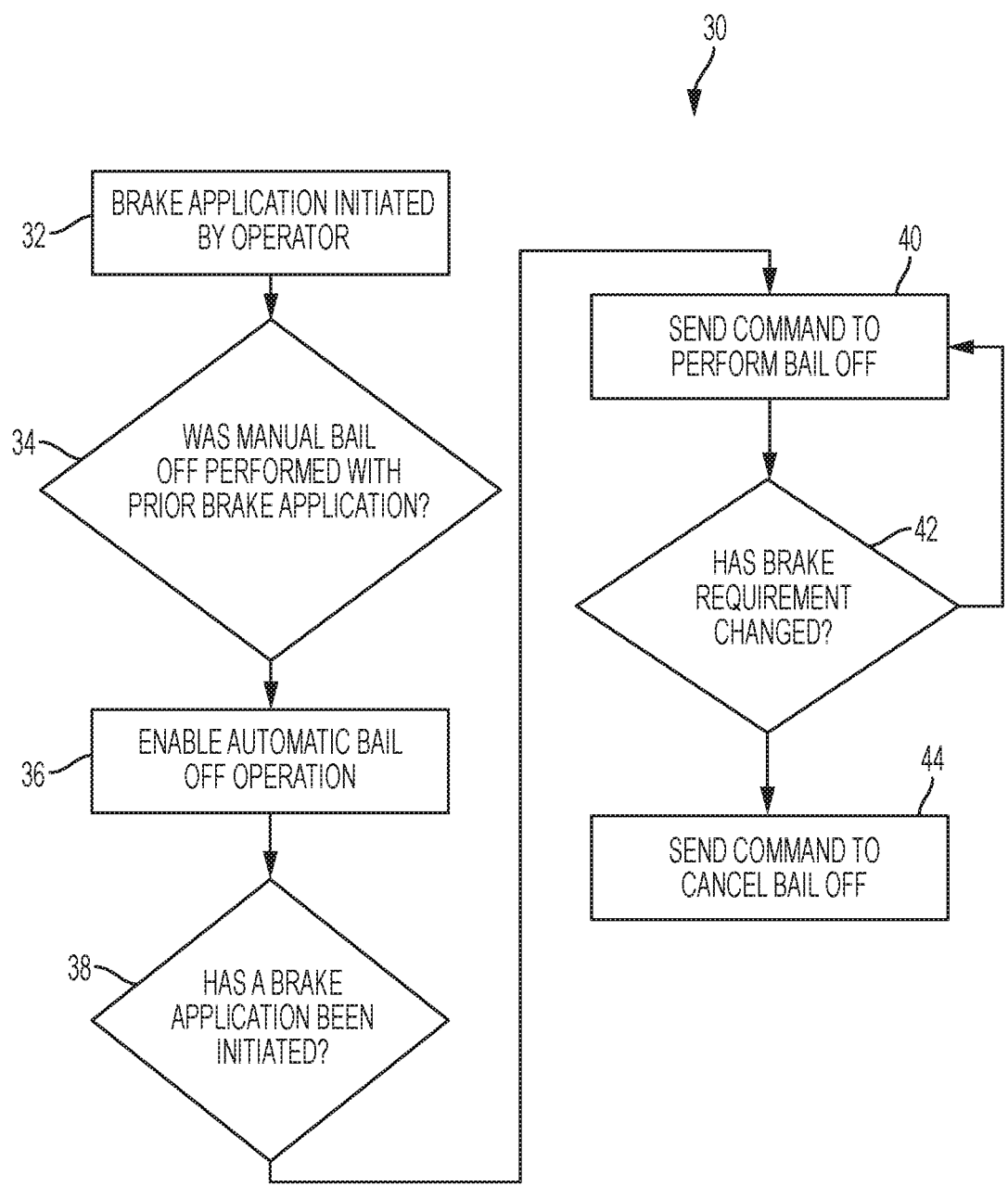
FIG. 2 is flowchart of a bail off process for a system for automatically providing a bail off of the locomotive brakes during a train brake application according to the present invention.

As seen in FIG. 2, system 10 may be configured to implement a bail off process 30 wherein controller 12 is programmed to initiate an automatic bail off operation based on prior manual braking applications performed by the locomotive operator. For example, once a brake application has been initiated by the train operator 32, controller 12 is programmed to perform a check 34 to determine whether a bail off operation was manually made in combination with a prior train brake application that was initiated by the operator. If so, controller 12 is enabled to perform an automatic bail off operation during the next train brake application 36. If a subsequent check 38 determines that a brake application has been initiated by the locomotive operator, controller 12 sends a bail off command 40 to locomotive braking system 24 to perform a bail off operation without any additional input from the locomotive operator. The bail off command may be configured to initiate a bail off operation for a predetermined time period, such as a default pre-established by the owner of system 10. Alternatively, the predetermined time period may be adjusted dynamically based on the amount of brake pipe reduction made by the operator, the size of the locomotive consist, or a target locomotive brake cylinder pressure. Finally, a check 42 is performed to determine whether the operator has changed the braking requirement, such as by moving the brake handle beyond the "full service" position or to another predetermined position and, if so, a command is sent by controller 12 to locomotive braking system 24 to cancel the bail off 44.

Figure 3:
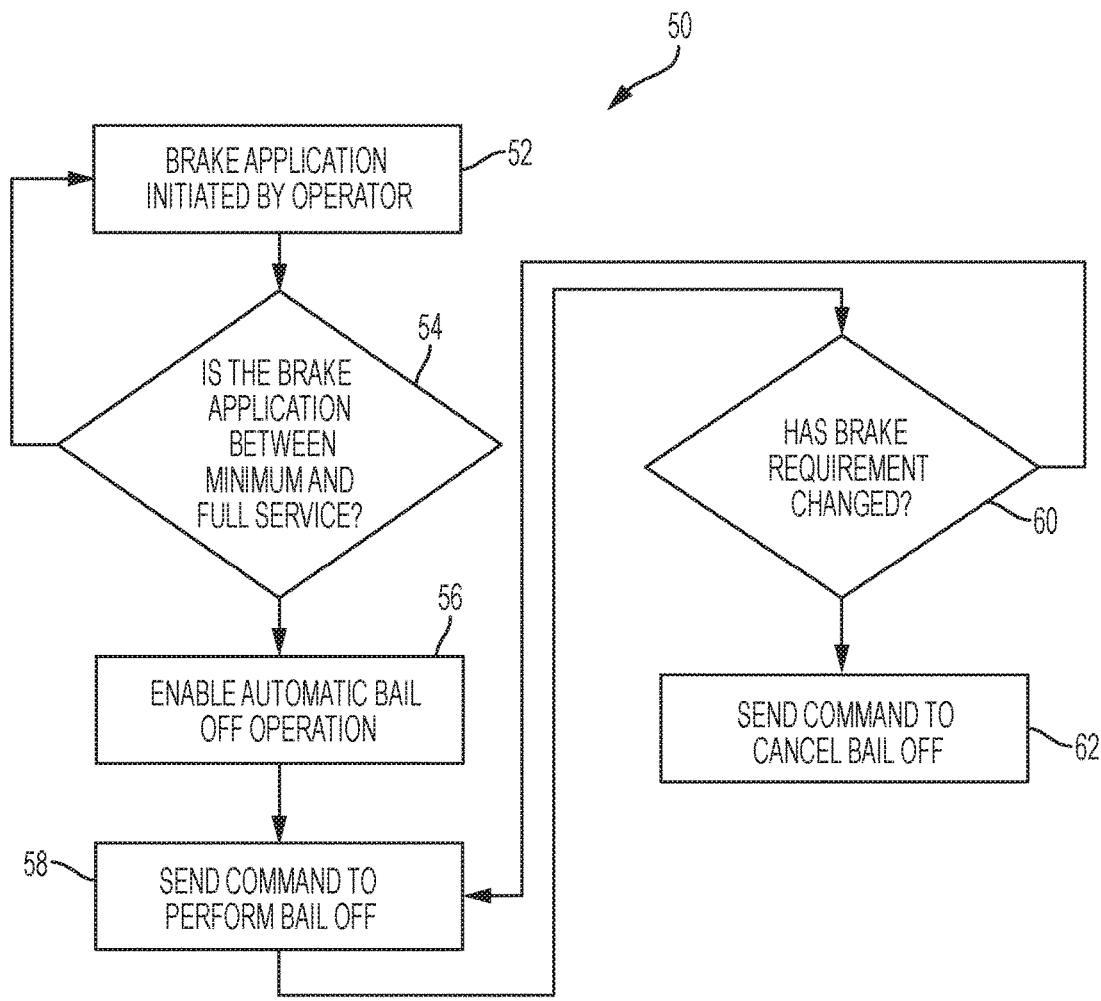
FIG. 3 is flowchart of another bail off process for a system for automatically providing a bail off of the locomotive brakes during a train brake application according to the present invention

As seen in FIG. 3, system 10 may be configured to implement another bail off process 50 wherein controller 12 is programmed to send a command initiating an automatic bail off operation in response to any manual brake application between "minimum" and "full service" that is requested by the locomotive operator. Thus, after a brake application has been initiated by the operator 52, a check 54 is performed to determine whether the operator has moved the train brake handle between the "minimum" and "full service" positions (or any other defined positions). If so, automatic bail off operations are enabled 56 and a command is sent to locomotive braking system 24 to perform a bail off operation 58 without any additional input from the locomotive operator. A check 60 is then performed to determine whether the operator has changed the braking requirement, such as by moving the brake handle beyond the "full service" position or to another predetermined position and, if so, the bail off is cancelled such as by controller 12 sending a command cancelling the bail off 62. In this process 50, as with other embodiments, the locomotive operator has the option at any time of manually performing a bail off procedure using the independent brake lever or executing an emergency brake application, which would be identified by check 60 and result in a cancelling of the automatic bail off operation.

Figure 4:
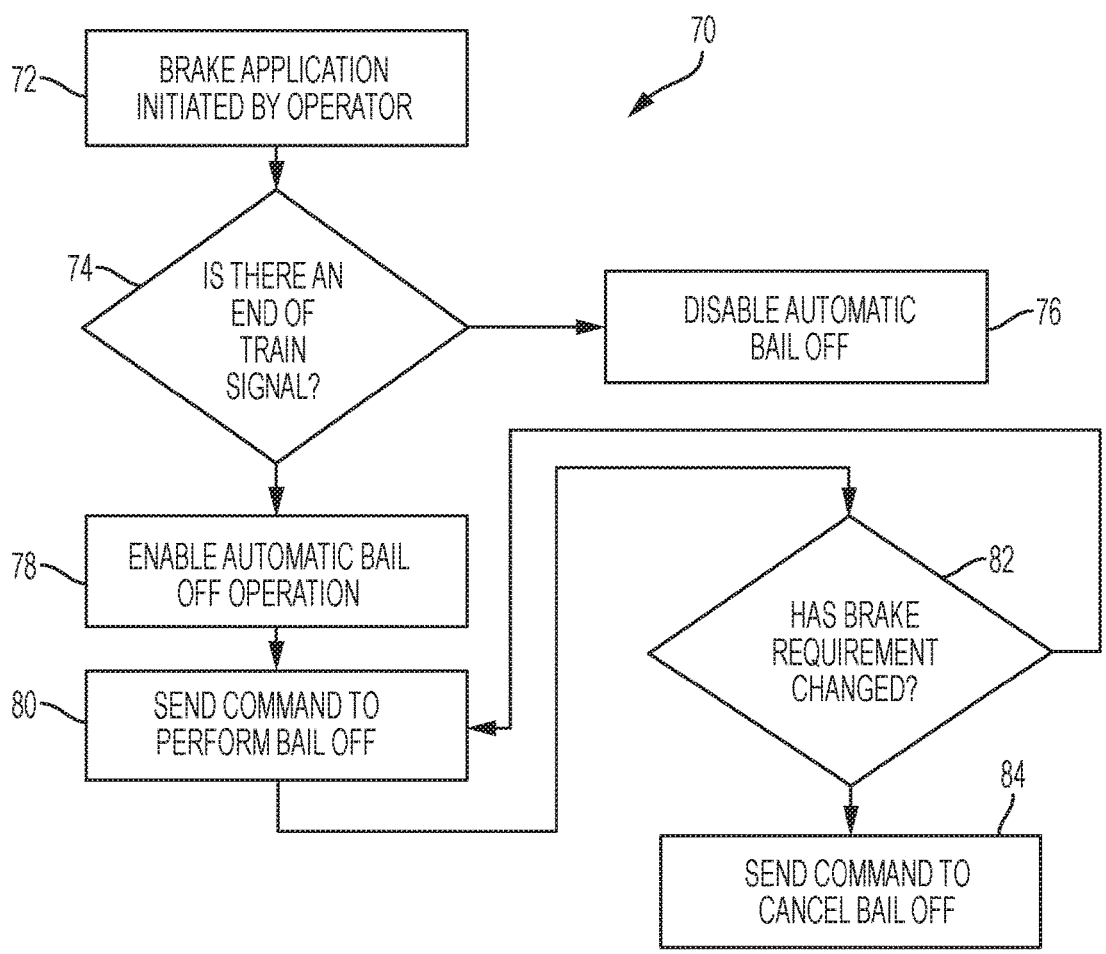
FIG. 4 is flowchart of a further bail off process for a system for automatically providing a bail off of the locomotive brakes during a train brake application according to the present invention.

As seen in FIG. 4, system 10 may be configured to implement a further bail off process 70 that determines whether there are freight cars attached to the locomotive or locomotive consist to mitigate the safety risk of a light locomotive. After a brake application has been initiated 72, a check 74 is performed of the end of train (EOT) brake pipe pressure signal available from the EOT in the locomotive to determine whether there is an EOT brake pipe pressure. If there is not any EOT brake pipe pressure, automatic bail off of controller 12 is disabled 76. If there is EOT brake pipe pressure at check 74, controller 12 is enabled 78 to send a command initiating an automatic bail off procedure and a command is send 80. In lieu of EOT brake pipe pressure, several other data items may be used as the triggering condition at check 74, such as a confirmed EOT communications address, an EOT heartbeat signal, or an EOT GPS signal, may be used as an EOT signal that allows controller 12 to enable the automatic bail function. As before, a check 82 may be made to determine whether the brake requirement has changed and, if so, a command sent to cancel the bail-off 84.

Figure 5:
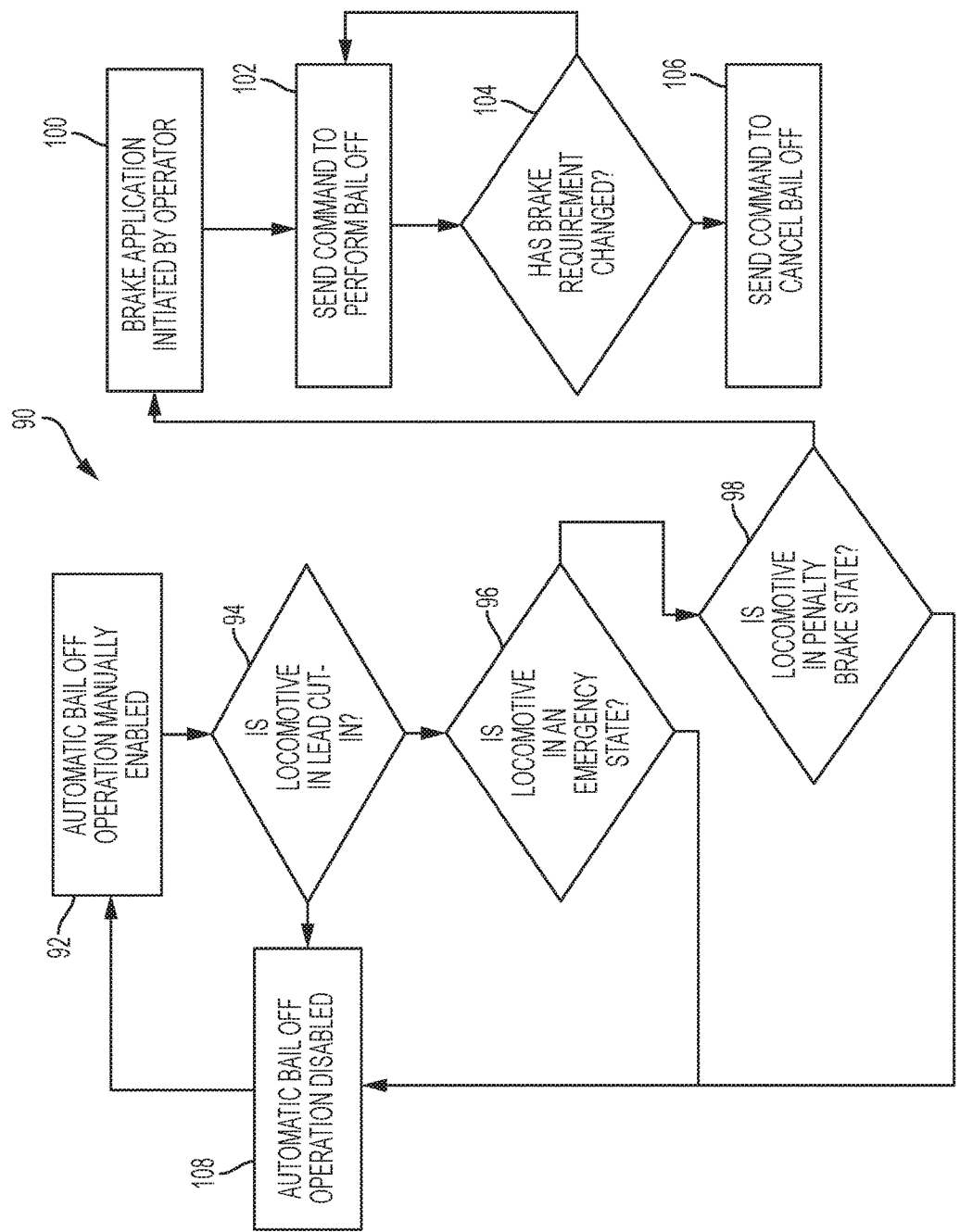
FIG. 5 is flowchart of an additional bail off process for a system for automatically providing a bail off of the locomotive brakes during a train brake application according to the present invention.

As seen in FIG. 5, controller 12 may be programmed to implement a process 90 where automatic bail off operations are enabled in response to an operator input to the locomotive driver's interface display or a momentary switch on the operative driver's control stand. First, automatic bail off operation is manually enabled by the operator 92. For safety, controller 12 is programmed to disable automatic bail off operation if a check 94 determines that the locomotive is not in lead cut-in, a check 96 determines that the locomotive is in an emergency state, or a check 98 determines that the locomotive is in a penalty brake state. In the event that controller 12 has disabled automatic bail off operation because of checks 94, 96, or 98, the operator must re-enable the function by manually enabling automatic bail off operations 92. If checks 94, 96, or 98 pass, and a brake application is subsequently initiated by the operator 100, controller 12 sends a command to perform a bail off 102. If a check 104 determines that the brake requirement has changed, a command cancelling the bail off is sent 106. If any of checks 94, 96, or 97 are negative, automatic bail-off operation is disabled 108.

Figure 6:
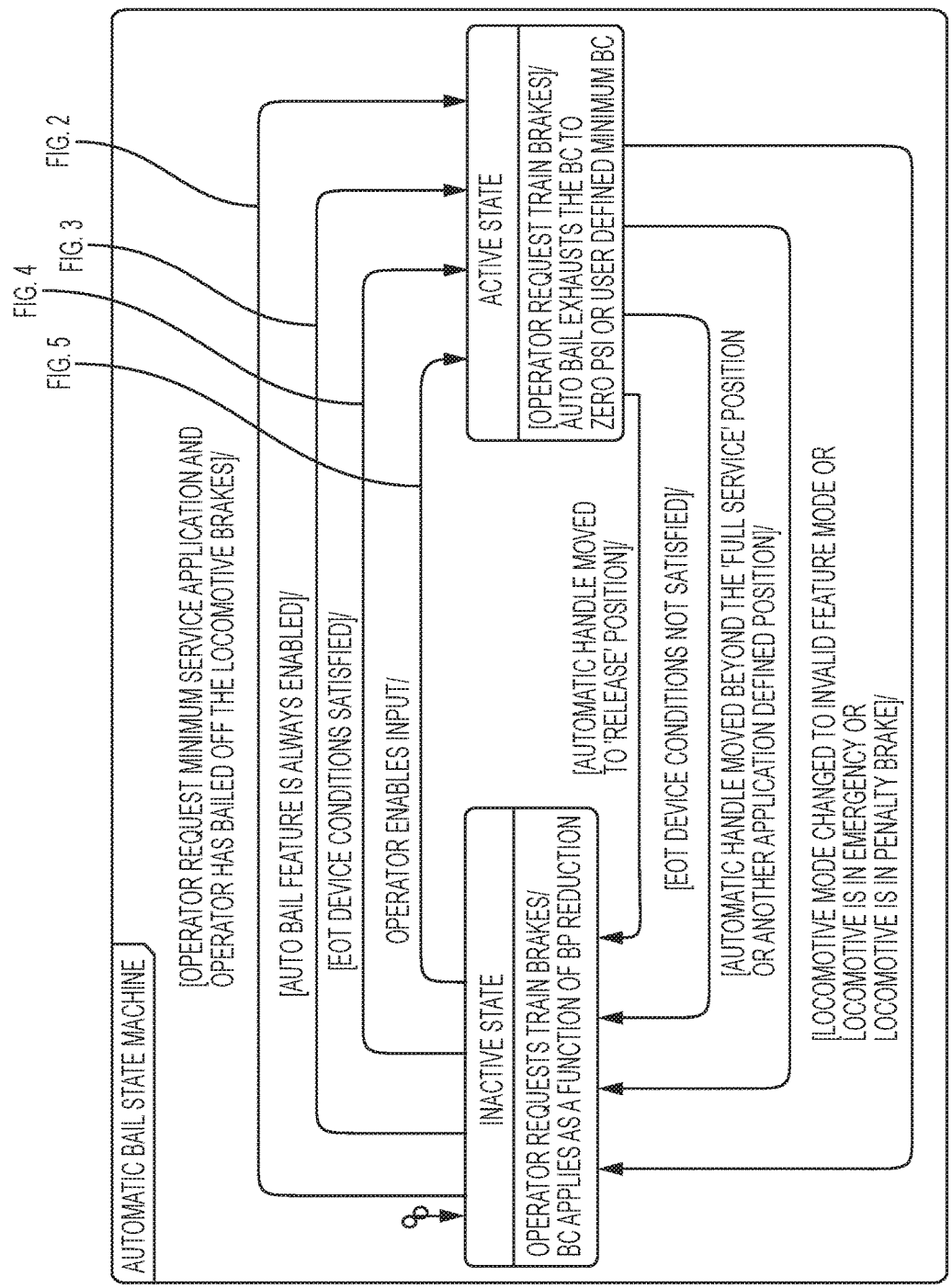

As seen in FIG. 6, processes 30, 50, 70, and 80 may be implemented simultaneously or made available in a single system 10 that allows for an automatic bail off operation to be enabled or disabled according to default settings, operator input, or the conditions of locomotive braking system. Thus, the controller may be programmed to perform any one of or all of the various approaches to performing an automatic bail off, thereby relieving the operator of the responsibility to manually input the train braking command into a first manual input as well as manually performing a bail off of the locomotive brakes using a second manual input.

What is claimed is:

1. A system for automatically bailing off a train having a locomotive braking system with at least one locomotive brake cylinder, the system comprising a controller programmed to determine when an operator of the train has initiated a train brake application and to send a bail off command to the locomotive braking system that results in a release of a predetermined amount of pressure from the at least one locomotive brake cylinder.

2. The system of claim 1, wherein the controller is programmed to determine whether the operator of the train performed a manual bail off of the locomotive braking system in connection with a prior train brake application and to enable the sending of the bail off command only if the operator of the train performed the manual bail off.

3. The system of claim 2, wherein the controller is programmed to send the bail off command if the operator of the train performed a manual bail off of the locomotive braking system in connection with a prior train brake application and the operator of the train subsequently initiates another brake application.

4. The system of claim 3, wherein the controller is programmed to determine whether the operator of the train has requested a subsequent brake application beyond the equivalent of a full service brake and, if so, to send a command cancelling the bail off.

5. The system of claim 1, wherein the controller is programmed to determine whether the operator of the train has initiated a brake application between a minimum service brake application and a full service brake application and to send the bail off command if the brake application is between a minimum service brake application and a full service brake application.

6. The system of claim 5, wherein the controller is programmed to determine whether the operator of the train has requested a subsequent brake application beyond the equivalent of a full service brake and, if so, to send a command cancelling the bail off.

7. The system of claim 1, wherein the controller is programmed to determine whether there is an end of train signal and to only send a bail off command if there is an end of train signal.

8. The system of claim 1, wherein the controller is programmed to determine if the locomotive is in lead cut-in prior to sending a bail off command.

9. The system of claim 8, wherein the controller is programmed to determine that locomotive is not in an emergency state prior to sending a bail off command.

10. The system of claim 9, wherein the controller is programmed to determine that the locomotive is not in a penalty state prior to sending a bail off command.

11. The system of claim 1, further comprising:
a train braking system associated with the controller;
a locomotive operator input interconnected to the train braking system and having a train brake handle and an independent brake handle;
a rail car braking system interconnected to the train braking system;
wherein the locomotive braking system is interconnected to the train braking system and is configured to respond to the bail off command sent by the controller by releasing the predetermined amount of pressure from the at least one locomotive brake cylinder.

* * * * *